(12) United States Patent
Ihde

(10) Patent No.: US 6,617,549 B2
(45) Date of Patent: Sep. 9, 2003

(54) METHOD AND APPARATUS FOR WELDING WITH RESTRIKE

(75) Inventor: Jeffrey Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/010,510

(22) Filed: Dec. 6, 2001

(65) Prior Publication Data

US 2003/0111452 A1 Jun. 19, 2003

(51) Int. Cl.[7] ................................................. B23K 9/09
(52) U.S. Cl. ............................. 219/137 PS; 219/130.21; 219/130.51
(58) Field of Search ..................... 219/137 PS, 130.21, 219/130.51

(56) References Cited

U.S. PATENT DOCUMENTS

| | | | | |
|---|---|---|---|---|
| 4,697,062 A | * | 9/1987 | Awano et al. | 219/130.21 |
| 4,889,969 A | * | 12/1989 | Kawai et al. | 219/130.21 |
| 5,866,873 A | * | 2/1999 | Wang et al. | 219/137 PS |
| 6,329,636 B1 | | 12/2001 | Geissler | |

OTHER PUBLICATIONS

Miller® The Power of Blue XMT® 304 (230/460 And 460/575 Volt Models) Owner's Manual Oct. 1999.
Miller® The Power of Blue S–64M Technical Manual Dec. 1998.
Miller® The Power of Blue S–64M Owner's Manual Jun. 2000.

* cited by examiner

Primary Examiner—Clifford C. Shaw
(74) Attorney, Agent, or Firm—George R. Corrigan

(57) ABSTRACT

A method and apparatus for welding, and particularly for clearing a short while welding is disclosed. If a short occurs, output current is increased from a first magnitude to a second magnitude and the short is monitored. If the short has not cleared after the current has reached the second magnitude the current is increased to a third magnitude. The difference between the second and first magnitudes is less than the difference between the third and second magnitudes. The current may be is increased from a fourth magnitude (which may be the normal operating magnitude) to the first magnitude before the increase to the second magnitude. The difference between the first and fourth magnitudes is less than the difference between the third magnitude and the second magnitude. The current is increased to the second magnitude only if the short has not cleared after the current is increased to the first magnitude.

34 Claims, 3 Drawing Sheets

METHOD AND APPARATUS FOR WELDING WITH RESTRIKE

FIELD OF THE INVENTION

The present invention relates generally to the art of arc welding. More specifically, it relates to clearing a shorted arc while arc welding.

BACKGROUND OF THE INVENTION

Electric arc welding is well known, and is performed with a variety of processes using a variety of types of equipment. One electric arc welding process is a MIG process, which is typically performed using a system for welding including a wire feeder and a power supply (a source of gas may also be included); An example of a prior art system for welding used in MIG and pulse spray welding is a Miller S64M™ wire feeder used with a Miller XMT304™ power supply.

Typically, in a MIG process, power is provided from the power supply to the wire feeder, and the wire feeder provides the wire and power to the arc. The wire feeder typically includes a controller, which may be part of or separate from the wire feeder, and which controls the wire feeder. Additionally, the controller provides a command signal to the power supply which causes the power supply to output a current and voltage at a desired magnitude. The command is produced in response to a user-selected wire feed speed and or output current or other parameters. Controller, as used herein, includes digital and analog, circuitry, discrete or integrated circuitry, microprocessors, DSPs, etc., and software, hardware and firmware, located on one or more boards, used to control devices such as power supplies, wire feeders, and used to control processes such as MIG, pulse-spray, TIG, etc.

MIG welding often is performed by cycling or pulsing between background current and a peak current (called normal operating currents). During a MIG process the arc will occasionally or frequently be shorted—wire will at times touch the workpiece (often during or at the end of the peak current), thus shorting the arc.

The controller receives feedback, such as output or arc voltage, and determines when a short occurs, for example by detecting when output voltage drops below a threshold. Prior art controllers then adjust the output current and or power to clear the short. A short is cleared When contact between the wire and the workpiece is eliminated, and or the arc is re-established. Clearing a short generally requires increasing the power provided to the arc to burn off the end of the wire (that is touching the workpiece).

There are two prior art methods of clearing a short, hard-restrike (or hard-clearing) and soft-restrike (or soft-clearing). Hard-restriking entails very rapidly increasing the current to above the peak current, typically, the maximum current output of the power supply (maximum current). A typical hard-restriking output is shown in FIG. 2. Hard-restriking clears bigger or hard short circuits (when substantial contact is made between the wire and the workpiece) well because hard-restriking provides the needed power to clear hard short circuits. However, hard restriking clears small or whisker short circuits poorly, because the sudden increase in power increases stick-out and arc voltage, thus adversely affecting the weld. Hard-clearing a short, as used herein, includes providing a sudden and substantial increase in current to the final clearing magnitude, such as to or near the maximum current available.

Soft-restriking entails increasing the current from the normal operating current by a series of small steps or increments, such as 5 amps. After each incremental increase, the current is maintained at that level for a brief period, such as for 2 msec. Prior to increasing the current by the next increment, the controller determines if the short has cleared. If the short has not cleared, the controller causes the current to increase incrementally to the next level. A typical prior art soft-clearing waveform is shown in FIG. 1. Soft-restriking clears bigger or hard short circuits poorly because soft-restriking doesn't provides the needed sudden increase in power to clear hard short circuits quickly enough. However, soft-restriking clears small or whisker short circuits well, because the incremental increases in power clear the short without adversely affecting the weld. Soft-clearing a short, as used herein, includes providing a gradual or incremental change in power, and determining if the short has cleared: prior to reaching the final clearing magnitude, and terminating the clearing routine if the short has cleared before the final clearing magnitude is reached.

Accordingly, a system for welding that clear both hard and soft shorts is desirable.

SUMMARY OF THE PRESENT INVENTION

According to a first aspect of the invention a method of clearing a short in a welding process includes increasing an output current from a first magnitude to a second magnitude and detecting if the short has cleared after the current has reached the second magnitude. The current is increased to a third magnitude, in the event the short hasn't cleared. The difference between the second and first magnitudes is less than the difference between the third and second magnitudes.

According to a second aspect of the invention a method of clearing a short in a welding process includes increasing an output current from a first magnitude to a second magnitude and detecting if the short has cleared after the current has reached the second magnitude. The current is increased to a hard clearing magnitude, in the event the short hasn't cleared, and the increase is completed even if the short clears when the current is increasing. The difference between the second magnitude and the first magnitude is less than the difference between the hard clearing magnitude and the second magnitude.

According to a third aspect of the invention a method of clearing a short in a welding process includes increasing an output current from a first magnitude to a second magnitude and detecting if the short has cleared after the current has reached the second magnitude, The current is linearly increased to a third magnitude, in the event the short hasn't cleared. The difference between the second and first magnitudes is less than the difference between the third and second magnitudes.

The current is increased from a fourth magnitude (which may be the normal operating magnitude) to the first magnitude in one embodiment. The difference between the first and fourth magnitudes is less than the difference between the third magnitude and the second magnitude. The current is increased to the second magnitude only if the short has not cleared after the current is increased to the first magnitude.

According to a fourth aspect of the invention a method of controlling a welding process includes detecting if a short is present and increasing an output current if the short is detected, This is repeated at least one more time. If the short is not cleared the current is increased to a second clearing magnitude. The last increase is greater than any earlier increase.

According to a third aspect of the invention a method of clearing a short in an arc welding process includes raising an output current by a first increment and then raising the current by a second increment if the short has not cleared. The current is raised by a third increment if the short has not cleared. The third increment is greater than the first and second increments.

The third magnitude is a maximum current output and or the first two increases are of the same magnitude in various embodiments.

According to a fifth aspect of the invention a method of clearing a short of an arc-welding process, includes increasing an output current to soft-clear the short and then increasing the current to hard-clear the short if the short did not clear from the soft-clear increase.

Increasing the current to soft-clear includes incrementing the current by at least two increments in another alternative.

According to a sixth aspect of the invention a system for welding includes a source of welding power a feedback module, and a controller, having a current command output connected to the control input on the source. The controller also includes a short detection module having a short detect output that is responsive to the feedback; module, and indicates the presence or absence of a shorted arc. A restrike module receives the short detect output, and has an incremented current command output with at least first, second and third increments. The command is responsive to the short detect output. The first increment is provided from the normal operating magnitude to a first clearing magnitude, the second increment is provided from the first clearing magnitude to a second clearing magnitude, and the third increment is provided from the second clearing magnitude to a third clearing magnitude. The third increment is greater than the first and second increments.

The first and second increments are equal, and or the third increment is not less than the sum of the first and second increments in various alternatives.

The short clearing module includes a time delay module and the incremented current command module is responsive to the time delay module in yet another alternative.

A wire feeder connected to the source of power, wherein the controller is part of the wire feeder in various embodiments.

According to yet another aspect of the invention a system for welding includes a source of welding power, a feed back module, and a controller, having a current command output connected to a control input on the source. The controller also includes a short detection module that indicates the presence or absence of a shorted arc. The controller also has a restrike module that, in response to a shorted arc, provides incremented current command having at least first and second increments; The second increment is greater.

According to another aspect of the invention a controller for clearing a short includes a current command output that soft-clears a short and hard-clears the short if the short did not clear in response to the soft-clearing.

Other principal features and advantages of the; invention will become apparent to those skilled in the art upon review of the following drawings, the detailed description and the appended claims.

Figure 1:
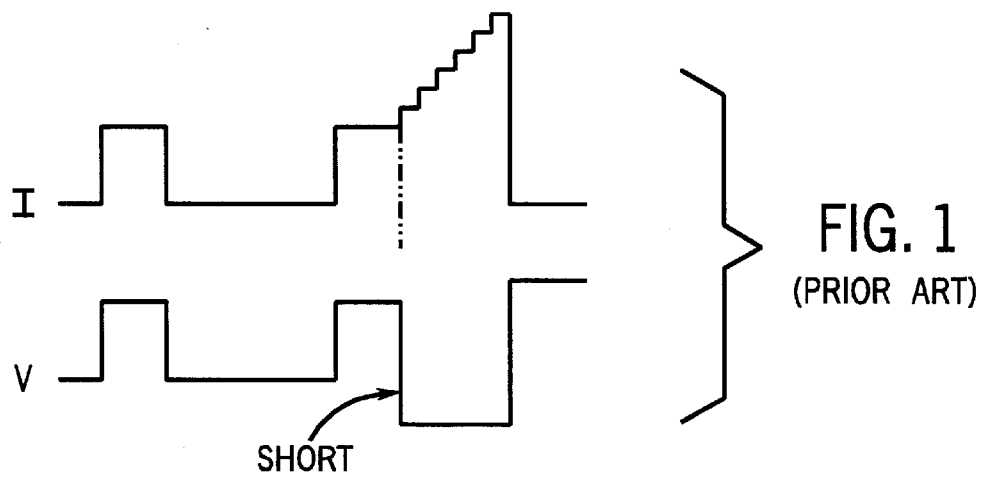
FIG. 1 shows current and voltage wave-forms for prior art soft-clearing.
Figure 2:
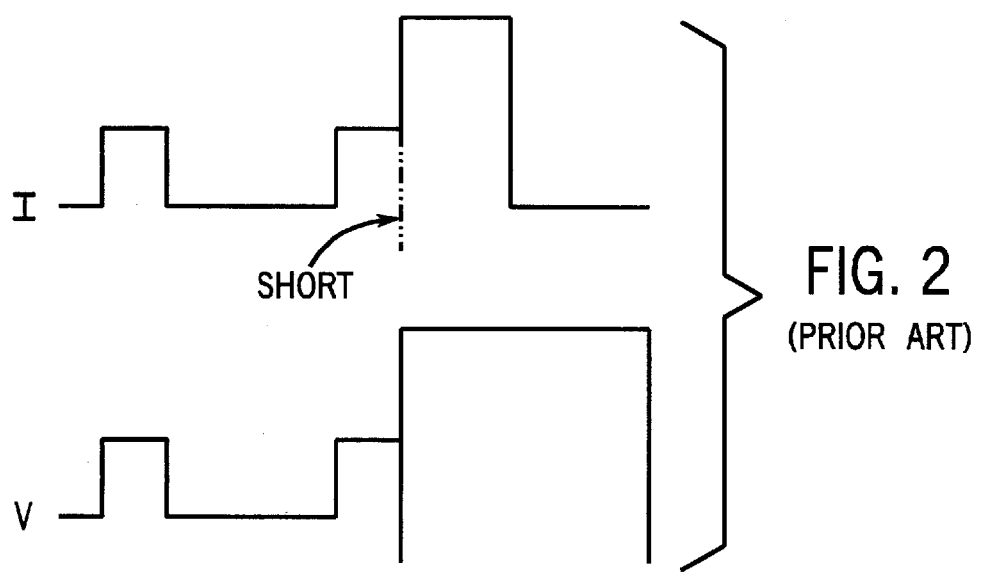
FIG. 2 shows current and voltage wave-forms for prior art hard-clearing.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system for welding used in a MIG welding process, it should be understood at the outset that the system can also be used with other systems and in other processes.

Generally, the invention provides for detecting a shorted arc, and clearing the arc with an output suitable for both hard-clearing and soft-clearing. More specially, the output current is controlled to provide one or more small increments in the current to soft-clear small shorts. Then, a large increment in the current is provided (to a hard-clearing magnitude) that hard-clears the short if it is a big short. Preferably, the system determines if the short has cleared before incrementing the current, and the control reverts back to the process control (i.e. The normal welding control) when the short clears, without completing the short-clearing routine.

Figure 3:
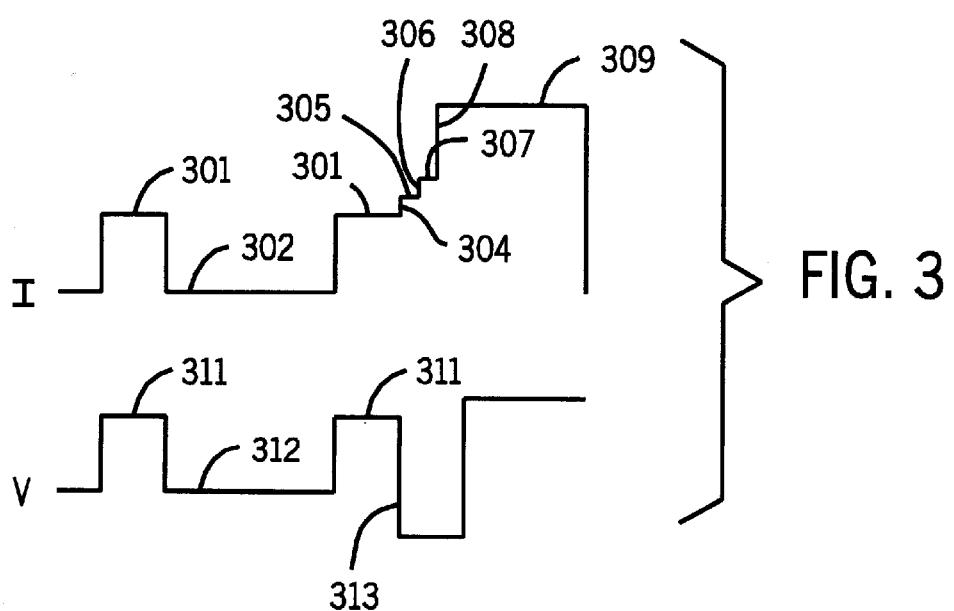
FIG. 3 shows current and voltage wave-forms for short clearing in accordance with the present invention.

FIG. 3 shows output current and voltage (the power applied to the arc) waveforms for a short-clearing in accordance with the present invention. The peak normal operating current and voltage is shown as 301 and 311, and the background normal operating current and voltage is shown as 302 and 312. A short occurs at 313, where the voltage drops below the normal process voltage. After the peak phase is completed, the current is incremented in a small step 304, followed by a plateau 305. If the short clears the current would then revert back to the background normal operating current. As shown, the short did not clear and the current is increased at step 306, again followed by a 30 plateau 307. Increments 304 305 and 306 307 soft-clear small shorts, and if the short clears the current reverts back to the background normal operating current. As shown, the short did not clear and the current is substantially increased at step 308 (to the system maximum in the preferred embodiment), again followed by a plateau 309. Increment 308 309 hard-clears large shorts. Thus, small shorts are cleared without unduly disrupting the weld process, and large shorts are cleared by the sudden power increase from increment 308 309.

Alternatives including providing only one, or more than two, small increments to soft-clear, additional large increments to hard-clear big shorts, and gradual changes in current (rather than abrupt), exponential changes, logarithmic changes, or changes based on other functions and slopes. Also, the short may be monitored continuously or intermittently such as after the current has reached a magnitude, and the clearing process ended immediately or sometime after the short clears. The current may be increased without regard to the short clearing when the current is increasing, or the increase may be stopped when the short clears.

Figure 4:
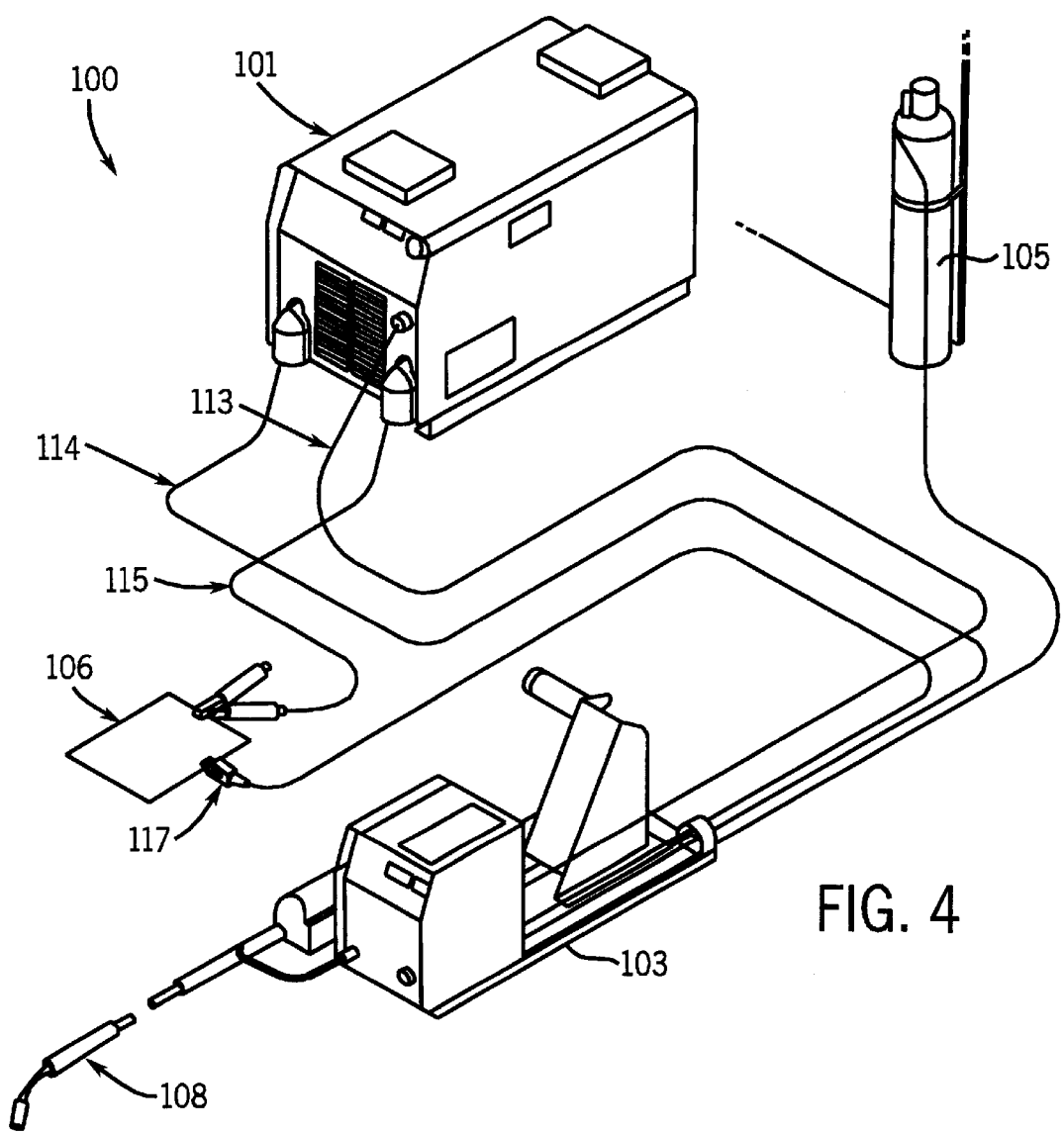
FIG. 4 shows a system for welding in accordance with the present invention.

Referring now to FIG. 4, a system for welding 100 in accordance with the present invention includes a power source 100, a wire feeder, a source of gas 105 which cooperate to provide welding power to a torch 108, for welding a workpiece 106. Power is provided from power source 101 (such as a Miller XMT 304®), on cables 114 and 115 to workpiece 106 and wire feeder 103 (such as a Miller S64M®). Control signals may be provided between power source 101 and wire feeder 103 on cable 113. Voltage feedback may be provided from clamp 117. Current feedback may be obtained within power source 101 or wire feeder 103. The system may be referred to as a source of power. Source of power, as used herein, may include the power supply and wire feeder, and any other components that deliver the welding power to the arc.

Figure 5:
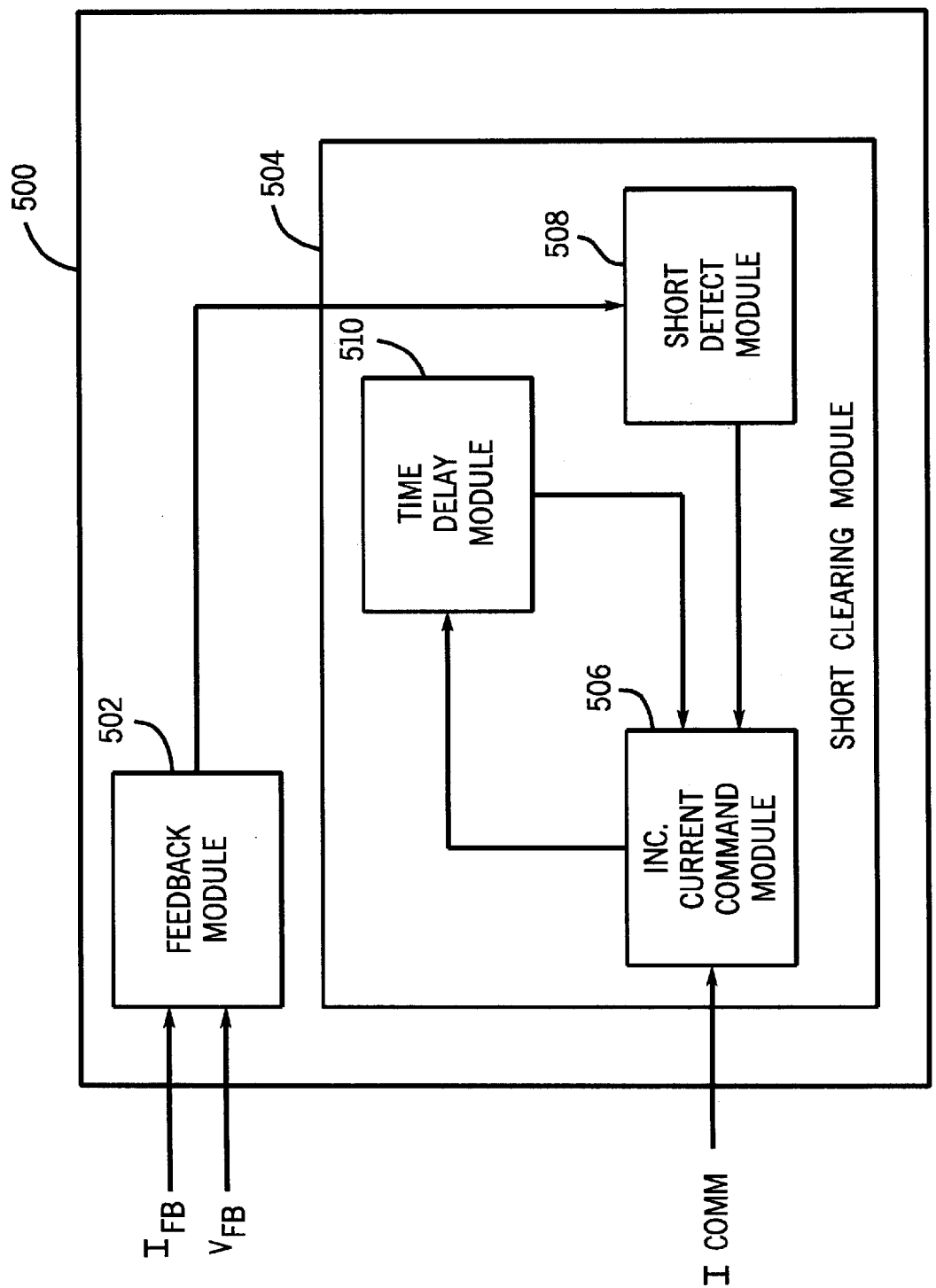
FIG. 5 shows a block diagram of a controller of a system for welding in accordance with the present invention.

A controller may reside in power source 101, wire feeder 103, both, or external to both. FIG. 5 is a block diagram of a portion of a controller 500 that implements one embodiment of the present invention, and includes a feedback module 502, a short clearing or restrike module 504, an incremented current command module 506, a short detect module 508, and a time delay module 510 that cooperate to provide a current command output such as that corresponding to FIG. 3. Module, as used herein, includes software and or hardware that cooperates to perform one or more tasks, and can include digital commands, power circuitry, networking hardware, etc.

The feedback module receives signals indicative of arc parameters such as current, voltage, power, or functions thereof. The feedback is provided to short detect module 508 (which may or may not be part of restrike module 504) which compares the voltage feedback to a threshold to determine if the arc is shorted. The result of that comparison is provided to current command module 506 as a short detect output.

Incremented current command module 506 also receives a signal from time delay module 510, which sets the length of the plateau before a subsequent current increase. Current command 506, upon detection and failure to clear a short, increments the current as described above. Preferably the increment is an abrupt change, but it may be a gradual change. Restrike module 504 may have other commands or circuitry used to clear the short.

The functions of controller 500 are implemented, to a large extent, with software and a microprocessor in the preferred embodiment. The following code, written in C, will result in a current command that produces the graph of FIG. 3.

```
if( Start_peak_timer==0)
    {
    if( new_current>CURRENT_SENSE_MIN )
    if( two_step_counter++<1)
        {
        if( ( restrike_dac_out+=340)>ABSOLUTE_
           DAC_MAX)
            restrike_dac_out=ABSOLUTE_DAC_
            MAX;
        }
    else
        restrike_dac_out=ABSOLUTE_DAC_MAX;
        }
```

Numerous modifications may be made to the present invention which still fall within the intended scope hereof. Thus, it should be apparent that there has been provided in accordance with the present invention method and apparatus for a system and method for welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of clearing a short in a welding process comprising:
   increasing an output current from a first magnitude to a second magnitude;
   detecting if the short has cleared after the current has reached the second magnitude; and
   increasing the current to a third magnitude, in the event the short hasn't cleared;
   wherein the difference between the second magnitude and the first magnitude is less than the difference between the third magnitude and the second magnitude.

2. The method of claim 1, further comprising:
   increasing the current from a fourth magnitude to the first magnitude, wherein the difference between the first magnitude and the fourth magnitude is less than the difference between the third magnitude and the second magnitude;
   determining if the short has cleared; and
   wherein the current is increased to the second magnitude only if the short has not cleared after the current is increased to the first magnitude.

3. The method of claim 1 wherein the third magnitude is a maximum current output.

4. A method of controlling a welding process comprising:
   a) detecting it a short is present;
   b) if a short is detected increasing an output current;
   c) repeating a) and b) at least one additional time;
   d) detecting if the short is present; and
   e) if a short is present increasing the current to a second clearing magnitude;
   wherein the increase of step e) is greater than any increase of step b).

5. The method of claim 4, wherein the increase of b) the additional time is the same as the increase of b) the first time.

6. The method of claim 5 wherein the second clearing magnitude is a maximum current output.

7. A method of clearing a short in an arc welding process, comprising:
   raising an output current by a first increment;
   raising the current by a second increment if the short has not cleared; and
   raising the current by a third increment if the short has not cleared;
   wherein the third increment is greater than the first and second increments.

8. The method of claim 7, wherein the first increment is equal to the second increment.

9. A method of clearing a short in a welding process comprising:
   increasing an output current from a first magnitude to a second magnitude;

detecting if the short has cleared after the current has reached the second magnitude; and increasing the current to a hard clearing magnitude, in the event the short hasn't cleared, and without regard to the short clearing when the current is increasing;

wherein the difference between the second magnitude and the first magnitude is less than the difference between the hard clearing magnitude and the second magnitude.

10. The method of claim 9, further comprising:

increasing the current from a normal operating magnitude to the first magnitude, wherein the difference between the first magnitude and the normal operating magnitude is less than the difference between the hard clearing magnitude and the second magnitude;

determining if the short has cleared; and wherein the current is increased to the second magnitude only if the short has not cleared.

11. A method of clearing a short in a welding process comprising:

increasing an output current from a first magnitude to a second magnitude;

detecting if the short has cleared after the current has reached the second magnitude; and linearly increasing the current to a third magnitude, in the event the short hasn't cleared;

wherein the difference between the second magnitude and the first magnitude is less than the difference between the third magnitude and the second magnitude.

12. The method of claim 11, further comprising:

increasing the current from a fourth magnitude to the first magnitude, wherein the difference between the first magnitude and the fourth magnitude is less than the difference between the third magnitude and the second magnitude;

determining if the short has cleared; and wherein the current is increased to the second magnitude only if the short has not cleared.

13. The method of claim 11, wherein increasing the current to soft-clear includes incrementing the current by at least two increments.

14. A method of clearing a short of an arc-welding process, comprising:

increasing an output current to soft-clear the short;

increasing the current to hard-clear the short if the short did not clear from the soft-clear increase.

15. A system for welding comprising:

a source of welding power, having a control input;

a feedback module;

a controller, having
 a current command output connected to the control input, and
 a short detection module having a short detect output, responsive to the feedback module, and indicative of the presence or absence of a shorted arc,
 a restrike module receiving as an input the short detect output, and having an incremented current command module responsive to the short detect output, further wherein the incremented current command output has at least first, second and third increments;

wherein the first increment is provided from a normal operating magnitude to a first clearing magnitude;

further wherein the second increment is provided from the first clearing magnitude to a second clearing magnitude;

further wherein the third increment is provided from the second clearing magnitude to a third clearing magnitude; and further wherein the third increment is greater than the first and second increments.

16. The system for welding of claim 15, wherein the first and second increments are equal.

17. The system for welding of claim 16 wherein the third increment is not less than the sum of the first and second increments.

18. The system for welding of claim 17, wherein the short clearing module includes a time delay module and wherein the incremented current command module is responsive to the time delay module.

19. The system for welding of claim 15 further comprising a wire feeder connected to the source of power, wherein the controller is part of the wire feeder.

20. A system for welding comprising:

a source of welding power having a control input;

a feed back module;

a controller, having
 a current command output connected to the control input, and
 a short detection module having a short detect output, responsive to the feedback module, and indicative of the presence or absence of a shorted arc,
 a restrike module receiving as an input short detect output, and having an incremented current command module responsive to the short detect output, further wherein the incremented current command output has at least first and second increments;

wherein the first increment is provided from a first magnitude to a second magnitude;

further wherein the second increment is provided from the second magnitude to a third magnitude;

further wherein the second increment is greater than the first increment.

21. The system for welding of claim 20, wherein the incremented current command has at least a third increment, wherein the third increment is provided from a fourth magnitude to the first magnitude, and further wherein the second increment is greater than the third increment.

22. The system for welding of claim 21, wherein the short clearing module includes a time delay and wherein the incremented current command module is responsive to the time delay.

23. The system for welding of claim 21 further comprising a wire feeder connected to the source of power, wherein the controller is part of the wire feeder.

24. A system for welding comprising:

means for providing welding power;

means for feeding back; and means for controlling the welding power, connected to the means for providing welding power and the means for feeding back;

wherein the means for controlling includes means for incrementing an output current command in response to a shorted arc such that the current is incremented at least a first increment and a second increment, such that the first increment is performed after a shorted arc is detected, and further such that the second increment is performed after the first increment, and if the shorted arc has not cleared, and further wherein the second increment is greater than the first increment.

25. The system for welding of claim 24, wherein the means for incrementing is such that the first increment is performed after a shorted arc is detected.

26. The system for welding of claim 24, wherein, the means for incrementing is such that the current is incremented a third increment, temporally before the first increment, wherein the third increment is less that the second increment.

27. A system for welding comprising:

means for providing welding power;

means for feeding back; and means for controlling the welding power, connected to the means for providing welding power and the means for feeding back;

wherein the means for controlling includes means for clearing a short by increasing current by at least first and second increment, wherein an output current is increased if the short has not cleared prior to the increase, and further wherein the second increment is greater than the first increment.

28. The system for welding of claim 27, wherein the means for clearing includes means for increasing by a third increment, temporally before the first increment, and wherein the third increment is less than the second, increment.

29. A controller that commands a welding system to clear a short comprising:

a current command output;

means for soft-clearing the short, connected to the current command output; and means for hard-clearing the short if the short did not clear in response to the means soft-clearing.

30. The controller of claim 29, wherein, the means for the soft-clearing includes means for incrementing an output current by at least two increments.

31. An apparatus for clearing a short in a welding process comprising:

means for increasing an output current from a first magnitude to a second magnitude, connected to a current command input;

means for detecting if the short has cleared after the current has reached the second magnitude; and increasing the current to a third magnitude, in the event the short hasn't cleared, connected to the current command input an further connect tot he means for detecting;

wherein the difference between the second magnitude and the first magnitude is less than the difference between the third magnitude and the second magnitude.

32. An apparatus for clearing a short in an arc welding process, comprising:

means for providing current;

means for raising an output current by a first increment, connected to the means for providing;

means for raising the current by a second increment if the short has not cleared, connected to the means for providing; and means for raising the current by a third increment if the short has not cleared, connected to the means for providing;

wherein the third increment is greater than the first and second increments.

33. An apparatus for clearing a short in a welding process comprising:

a source of current;

means for increasing an output current from a first magnitude to a second magnitude, connected to the source of current;

means for detecting if the short has cleared after the current has reached the second magnitude, connected to the source of current; and means for linearly increasing the current to a third magnitude, in the event the short hasn't cleared, connected to the source of current;

wherein the difference between the second magnitude and the first magnitude is less than the difference between the third magnitude and the second magnitude.

34. A method of clearing a short of an arc-welding process, comprising:

a source of current;

means for increasing an output current to soft-clear the short;

increasing the current to hard-clear the short if the short did not clear from the soft-clear increase.

* * * * *